June 6, 1950　　　C. K. WILKINSON ET AL　　　2,510,161
SIMULATED AIR SPEED INDICATING MEANS FOR
AVIATION GROUND TRAINERS
Filed Oct. 7, 1944　　　　　　　　　　2 Sheets-Sheet 2

Inventor
CLAUDE K. WILKINSON
REEVE C. MOREHOUSE
By Ralph L. Chappell
Attorney

Patented June 6, 1950

2,510,161

UNITED STATES PATENT OFFICE 2,510,161

SIMULATED AIR-SPEED INDICATING MEANS FOR AVIATION GROUND TRAINERS

Claude K. Wilkinson and Reeve C. Morehouse, United States Navy

Application October 7, 1944, Serial No. 557,733

12 Claims. (Cl. 35—12)

(Granted under the act of March 3, 1883, as amended April 30, 1928; 370 O. G. 757)

This invention pertains to indicators and more especially to means for indicating air speed in response to the manipulation of the controls of ground trainers.

The ground or synthetic trainer is designed to give the student pilot experience in reading flight instruments such as are employed on the instrument panel of a plane, the instruments being linked up with the various controls in the trainer to give a response on the face of the instruments for a given movement of the controls, which corresponding instruments in actual flight would give with similar movement of the controls during flight. As heretofore designed instruments for this purpose in the ground trainer have been actuated by a combination of mechanical and pneumatic means.

It is an object of the present invention to provide an air speed indicator for use on the panel board of a ground trainer which is electrically operated in response to the controls of a ground trainer to simulate flight conditions, which is simple in design and which may readily be installed in existing trainers without undue change therein.

As illustrated herein, three speed indicating instruments are employed, one for the pilot, one for the co-pilot and one for the instructor. Invention resides in a motor-generator combination in which the aforesaid instruments are connected to the output side of the generator and are calibrated to indicate air speed which is proportional to the voltage in the output side of the generator, means operable to vary the input to the motor, thereby to vary the output of the generator, and means automatically actuated in response to the attitude of the trainer to effect variation of the aforesaid means thereby to cause the instruments to read air speeds which will correspond to the reading of similar instruments in a plane under similar conditions during actual flight. The ground trainer is provided with simulated throttles and in accordance with the invention, there is also means for varying the input to the motor in response to the throttle opening to cause the instruments to indicate air speed corresponding to the response of an actual plane under similar throttle openings in flight. Various other factors effect the speed of a plane for a given throttle opening and one of these is the lowering and raising of floats or of landing gear as it takes off or comes in for a landing. Levers are provided in the trainer for simulating the manipulation of the floats or landing gear and in order that the student may see just what effect the lowering and raising of his landing gear has upon the reading of his air speed instruments, and so that he may adjust the throttle to take care of any decrease in landing speed due to the lowering of the floats or landing gear, there is means connected to the output side of the generator operable by the aforesaid lever to place a resistance in the circuit which causes the air speed instrument to show a decrease in air speed corresponding to the actual decrease in air speed caused by the lowering of landing gear or of floats in a plane in actual flight. While on the ground and while climbing to normal flight level, the aforesaid circuit will cause the instruments to show air speeds greater than is actually the case since there is a lag due to water and ground resistance. To avoid this and to simulate the lag incident to take off and climb to stabilized flight the circuit is altered by a manual switch provided for this purpose and means is simultaneously placed in the circuit which may be manually actuated to cause the instruments to simulate the lag in speed incident to take off which would normally be evident in an actual plane. To this end and in accordance with yet another feature of the invention, there is connected to the output side of the generator, a variable resistance arranged to be manually actuated by an instructor to cause the instruments to simulate the air speed of the plane from the time when the plane starts from rest until it leaves the ground and acquires stabilized flight conditions.

A description of the invention will now be set forth in detail with reference to the accompanying drawing; in which.

Figure 1:
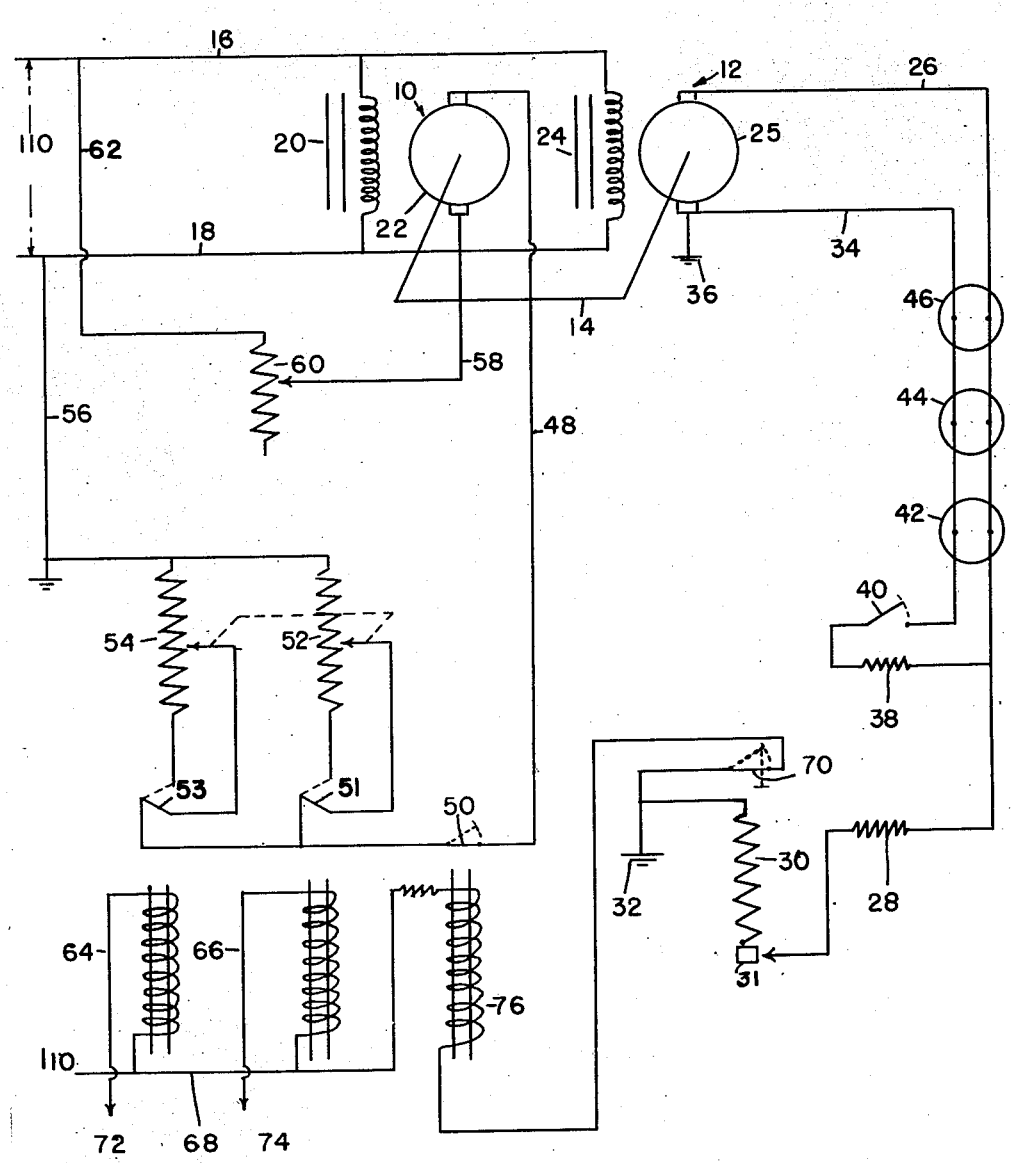
Fig. 1 is a diagrammatic lay-out of the instruments and electrical circuit which embodies my invention.
Figure 2:
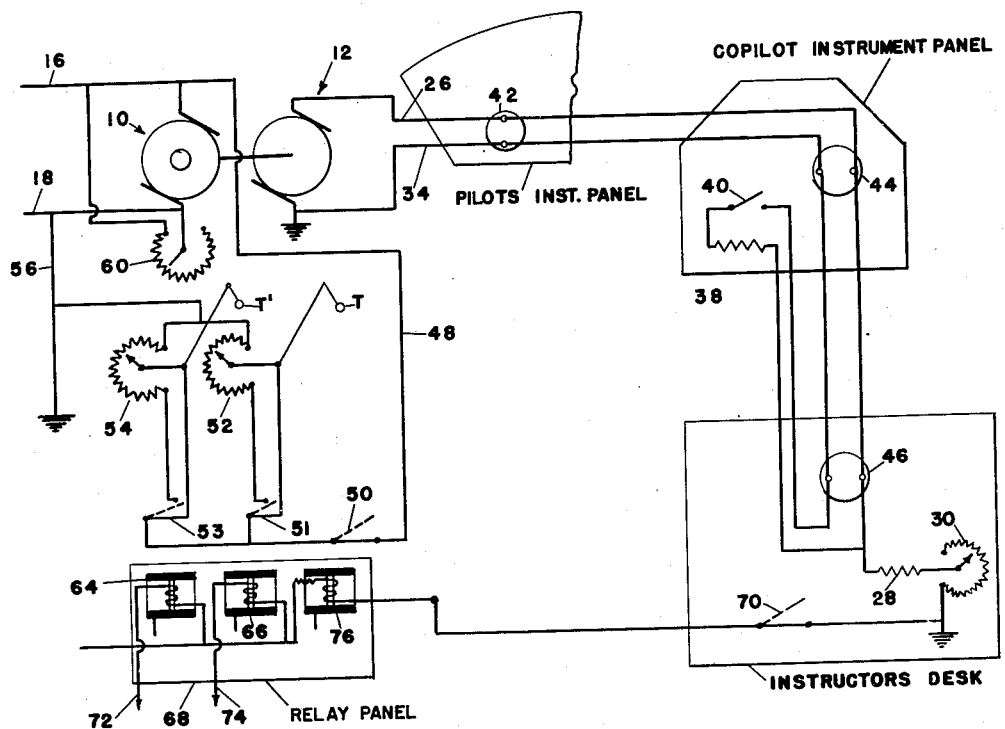
Fig. 2 is a diagrammatic lay-out of the wiring and instrument panels.

Referring to Figs. 1 and 2 there is shown diagrammatically three electrical instruments 42, 44 and 46 which are installed in a ground trainer system, the instruments being positioned on the instrument panels for the pilot, co-pilot and instructor Fig. 2 and being calibrated in units of air speed. The instruments are energized by current from a generator 12 whose field winding 24 Fig. 1 is maintained substantially constant by connecting it directly across supply lines 16 and 18, the latter being connected to a source of 110-v. direct current. The armature 25 of the generator 12 is driven by a motor 10 to which it is coupled by mechanical means 14. The field winding 20 of the motor is also connected across the supply lines 16 and 18.

During simulated flight, it is desirable to cause the electric instruments 42, 44 and 46 to simulate actual air speed instruments in response to actual plane conditions, that is, for changes in the attitude of the plane, variations in the throttle opening and the employ of one or more engines. If it is assumed that a plane is flying at constant throttle opening, and the controls are operated to cause the nose of the plane to tilt up as for climbing, it is evident that there will be a drop in air speed which will register on the air speed instrument by movement of the pointer on the instrument to a lower reading. If the pilot is acutely aware of the meaning and effect of the drop in the air speed as indicated by his air speed instrument, he will immediately be warned thereby that to maintain way, that is to maintain the speed requisite to climbing, he must increase his throttle opening, otherwise he may loose speed so rapidly that the plane may stall and fall into a spin. This loss in air speed due to a climb is simulated in the ground trainer on the instruments 42, 44 and 46 by inserting a rheostat 60, which is simply a variable resistance, in series with the armature 22 of the motor 10 by way of conductors 58 and 62. The resistance of the rheostat 60 is automatically varied by the angular position of the trainer, Fig. 3 which is so mechanically mounted that it may be made to assume any attitude that the actual plane would in flight by manipulation of the controls. The rheostat 60 is mechanically connected to the trainer so that as the nose of the trainer is tilted upwardly in response to its controls to simulate climbing, the resistance is increased. An increase in resistance of the rheostat 60 decreases the power input to the armature 22 of the motor 10 which results in a decrease in the speed of the motor and hence a decrease in the speed of rotation of the generator armature 25. The decrease in the speed of the generator results in a decrease in voltage output. The instruments 42, 44 and 46 are connected across the armature 25 of the generator by way of conductors 26 and 34 and are calibrated to read air speed, these readings being proportional to the voltage, and hence for a decrease in voltage the instruments will show a lower air speed. If on the other hand, the nose of the trainer is tipped down in response to the controls and at a constant throttle there will be an increase in air speed. In the arrangement described, an increase in the air speed will show up on the instruments 42, 44 and 46 due to the fact that when the trainer tips down the resistance in the rheostat 60 will automatically be decreased, hence increasing the power input to the armature 22, increasing the speed of the generator 12, the amount of voltage output from the armature 25 anad hence supplying an increased voltage to the instruments. This results in an increase in the air speed reading. As the tilt of the plane upwardly or downwardly increases, the air speed instruments will show greater and greater speed change which will warn the pilot that he must maneuver the controls to keep from going into a dive or a spin which he may be unable to pull out of. It is evident from the above that for any change in the attitude, that is, the angular position of the trainer, at constant throttle opening, there will be a change in the air speed instruments which will assist the pilot in quickly gaining a knowledge of the attitude of his plane solely with reference to his air speed instruments, and hence will give him training in blind flying.

Figure 3:
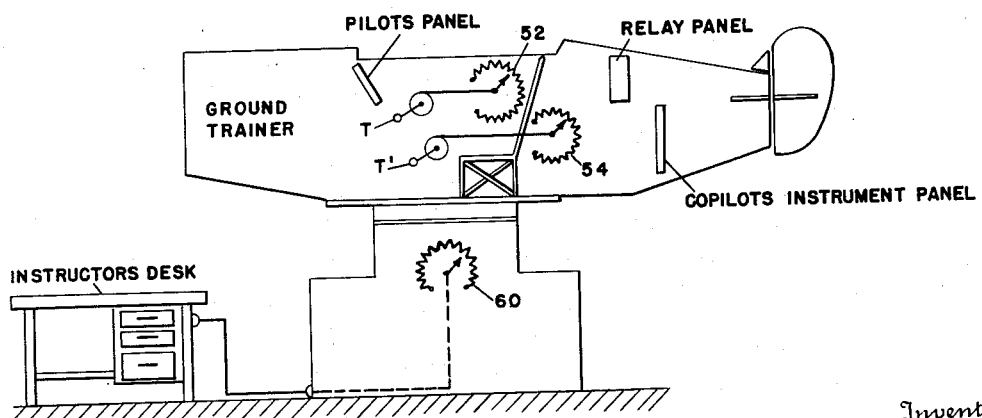
Fig. 3 is a diagrammatic showing of a ground trainer and instructor's desk.

It is also desirable to have the instruments responsive as they would be in actual plane flight to changes in the throttle openings of the engines, that is, an increase in throttle opening at a constant level of flight should show an increase in air speed, while for a decrease in throttle opening there should be a decrease in air speed. Hence, there is also connected in series with the armature 22 by way of conduits 48 and 56, a pair of rheostats 52 and 54 in parallel, the resistances of which may be varied in accordance with the throttle opening of the engines which they simulate. The resistances are varied by simulated throttle handles T and T1 connected to the rheostats as shown in Figs. 2 and 3. As illustrated herein, if the trainer is being operated under conditions simulating both engines running the two parallel connected rheostats 52 and 54 will be in the motor armature circuit and so connected therein that their resistances may be varied by the operation of the levers in the ground trainer which simulates the throttle levers in a plane. As illustrated, switches 51 and 53 are provided which are thrown to simulate conditions when the engines are running to cause the current to pass through the variable sides of the rheostats 52 and 54 and the variable sides are directly actuated to vary the resistances by the throttle control levers in the ground trainer, the throttle control levers being operated in synchronism to simulate synchronously operable engines. When the throttle openings are increased the resistances are decreased and hence the power input to the motor 10 is increased, and as the generator speed increases the voltage output of the generator increases and the instruments 42, 44 and 46 show an increase in air speed. If, however, the throttles are decreased, the resistances are automatically increased with the result that the air speed instruments show a decrease in air speed. As placed in the circuit, total resistances of the rheostats 52 and 54 equal the reciprocal of the sum of the reciprocals so that the acceleration and deceleration effects of an actual airplane will be closely approximated, both engines being synchronously operated.

In other words, with switches 51 and 53 in the positions shown in full lines in Figs. 1 and 2 to simulate the conditions with both engines running, the total resistance of the parallel circuit is equal to one half of the resistance in each leg thereof. Any variation in the positions of the throttle control levers, which are synchronously operable, will alter the amount of resistance in each leg equally and will therefore proportionally alter the power input to motor 10 with a corresponding alteration in the readings of instruments 42, 44 and 46.

While the operation of the air speed instruments have been described, thus far for simplicity with an assumption of constant throttle opening or constant level flight, it is to be observed that an actual plane will not be operated under such conditions all of the time but in flight will vary in attitude and throttle simultaneously so that any increase in the reading of the air speed instruments will depend upon a combination of attitude and throttle opening. Actual flight conditions will be simulated in the trainer and will register in the instruments by means of the fact that they will respond to the amount of voltage impressed on them which in turn is the resultant of the attitude of the plane and the throttle opening.

Not infrequently, if there is more than one engine in the plane one of the engines will be stopped through failure of the same, or for some other reason, and in order to acquaint the pilot with the behavior of the air speed instruments under these conditions, and also when both engines are stopped if for instance in a glide, the rheostats 52 and 54 are so arranged that by throwing the switches 51 and 53 to the dotted line position the whole resistance of these rheostats may be cut into the circuit. This decreases the power input to the motor 10, and hence results in a decrease in air speed which simulates stopping one or both of the engines. The switches 53 and 51 are automatically thrown from one position to the other by a pair of electromagnet relays 64 and 66, respectively. The electromagnet relays are supplied with current from a 110-v. direct current line 68 and are automatically energized by way of leads 72 and 74 when the simulated engines in the trainer are started or stopped, means being provided in the trainer for simulating starting or stopping the engines. When both engines are running, the electromagnets of the relays 64 and 66 are energized and operate to throw the switches 53 and 51 to the full line positions and hence to the variable sides of the rheostats so that the resistance may be varied with variations in the throttle opening. When the simulated engines are stopped, the relays will become deenergized and the switches 51 and 53 will be thrown to the dotted line position to cut in the entire resistance of the rheostats 52 and 54. It is evident that either or both engines may be running or stopped.

It is desirable to be able to cut out the armature circuit of the motor 10 which includes rheostats 52 and 54 and 60 so that the instruments 42, 44 and 46 do not respond to the attitude of the plane or throttle opening for example, when the plane is merely taxiing or any other period selected by the instructor, hence there is provided a cut out for the circuit during this period. As illustrated herein, this is made possible by a switch 70 preferably located on the instructor's desk, in the supply line 68, movement of switch 70 to the dotted line position shown in Figs. 1 and 2 acting to break the circuit from the line 68 to its ground 32. By breaking the circuit, an electromagnet relay 76 also in the line 68 is deenergized which allows a switch 50 in the motor armature circuit to open. The switch 70 is held open while the trainer is still supposedly on the ground or water so that the instruments 42, 44 and 46 indicate no reading. Before the plane leaves the surface of the water or the ground, that is, during the run from standstill to take off, the plane lags in its response to its controls and hence the air speed instruments respond differentially. To simulate this lag, a rheostat 30 having a variable resistance is placed across the armature circuit of the generator. As the air speed of the trainer increases, in a simulated take off and climb, this resistance is manually increased by the instructor to cause the air speed instruments to show an increase in air speed reading which corresponds to that of an actual plane as it takes off. At stabilized speed, the resistance in the rheostat 30 is cut out by movement of the contact point over onto the tab 31 and the armature circuit governs the flying conditions of the trainer in simulated flight. A resistance 28 is placed in the armature circuit of the generator adjacent to the rheostat 30 to regulate the current flow, and hence to avoid complete short circuiting.

During take off and landing, the floats or landing gear present considerable air resistance and hence retard the speed of a plane for a given throttle opening. To simulate this condition in the ground trainer, there is inserted across the armature circuit of the generator, a resistance 38 which may be cut into and out of the circuit by a switch 40. Actuation of the switch will load the circuit, thereby causing the instruments to show a lower air speed and hence to simulate an extended position of the landing gear or floats, or unload the circuit thereby causing the instruments to show a normal air speed for a given throttle opening, and hence to simulate a retracted position of the landing gear or floats.

In operation, the student pilot and co-pilot after seating themselves in the ground trainer, start the simulated engines and proceed to operate the controls to make a simulated take off. At this time they watch their respective air speed instruments, and the instructor who observes the third instrument manually varies the rheostat 30 to simulate the air speed increase during the take off period up until stabilized flight condition is attained, whereupon the resistance 30 is cut out. During the run from rest to take off, the extended position of the landing gear or floats automatically operate to hold the switch 40 closed so that the resistances of the landing gear or floats is evident, and is reflected in the instrument by a lower air speed than would normally be indicated for the given throttle opening. As the plane rises from the ground and begins to climb, the pilot or co-pilot operates the controls to retract the landing gear or floats which opens the switch 40. From then on the instruments are controlled by the attitude of the plane, by the throttle openings, and by the operation of the engines to simulate an increase or decrease in the air speed of the plane in accordance with any combination of variations in these controls. The instrument for the co-pilot gives the co-pilot an opportunity to study the response of the plane to the pilot's manipulation of its controls and thereby to learn by the mistakes of the pilot, while the instructor's instrument, which is not necessarily in the ground trainer itself, but may be placed on a table or desk near the trainer, enables the instructor to determine just what mistakes the pilot is making, so that he may be instructed as to how to correct his flying technique.

The invention described herein may be manufactured and used by or for the Government of the United States of America for governmental purposes without the payment of any royalties thereon or therefor.

What is claimed is:

1. In a ground trainer for airplane pilots, means simulating the control of a pair of engines, simulated air speed indicators, a motor generator combination, means connecting said indicators to the output side of the generator, said indicators being calibrated to indicate a change in air speed which is proportional to the voltage in the output side of the generator, resistances in the motor circuit for reducing the output of the generator and relays associated with said resistances, said relays being operable in response to actuation of the first-mentioned means to a position simulating stopping of the engines to throw the entire resistances into the motor circuit.

2. In a ground trainer for airplane pilots, a simulated air speed indicator, a motor generator combination, means connecting said air speed indicator to the output side of the generator, said air speed indicator being calibrated to indicate a change in air speed which is proportional to the voltage in the output side of the generator, a variable resistance in the motor circuit for varying the input to the motor and hence the output of the generator, means for automatically varying the variable resistance in accordance with the attitude of the trainer to simulate flight conditions, and means to cut the variable resistance out of the motor circuit.

3. In a ground trainer for airplane pilots, means simulating on and off controls for engines, means operable to simulate opening and closing the engine throttles, simulated air speed indicators, a motor generator combination, means connecting the air speed indicators to the output side of the generator, said air speed indicators being calibrated to indicate a change in the air speed which is proportional to the voltage in the output side of the generator, and a variable resistance in the motor circuit for each of the engine throttle control simulating means, said resistances being variable by the throttle simulating means and impressed in their entirety in the motor circuit when said engine on and off controls simulating means are actuated to the off position.

4. In a ground trainer for aircraft pilots having controls for changing the attitude of the trainer, means simulating on and off controls for an engine and a lever operable to simulate opening and closing the engine throttle; simulated air speed indicators, a motor generator combination, means connecting the air speed indicators to the output side of the generator, said instruments being calibrated to indicate a change in air speed which is proportional to the voltage in the output side of the generator, and variable resistances in the motor circuit, one of said resistances being automatically variable with a change in attitude of the trainer, and the other of said resistances being variable in response to the actuation of the lever, said last named resistance being adapted to be impressed in its entirely in the motor circuit by actuation of the engine on and off controls simulating means to off position.

5. In a ground trainer for aircraft pilots, a simulated air speed indicator, a motor generator combination, means connecting said indicator to the output side of the generator, said indicator being calibrated to indicate a change in air speed which is proportional to the voltage in the output side of the generator, a variable resistor in the motor circuit, means responsive to the attitude of the trainer for automatically varying said resistor, and means including an electro-magnetic switch operable for cutting out the motor armature circuit to simulate the effect on air speed of a landing of the trainer.

6. In a ground trainer for aircraft pilots, a simulated air speed indicator, a motor generator combination, means connecting the air speed indicator to the output side of the generator, said air speed indicator being calibrated to indicate a change in speed which is proportional to the voltage in the output side of the generator, a resistance insertable in the output side of the generator to put a load on the generator, said resistance being adapted to simulate the effect on the aircraft air speed due to the air resistance offered by the lowering of landing gear in flight prior to landings, and means for controlling the insertion of said resistance.

7. In a ground trainer for airplane pilots, a simulated air speed indicator, a motor generator combination, means connecting said air speed indicator to the output side of the generator, said air speed indicator being calibrated to indicate a change in air speed which is proportional to the voltage in the output side of the generator, a variable resistance in the output side of the generator, manual means for varying the resistance during the simulated take off and climb of the plane to stabilized flight conditions, and means for cutting said resistance out of circuit when stabilization has been attained.

8. In a ground trainer for airplane pilots, a simulated air speed indicator, a motor generator combination, means connecting said air speed indicator to the output side of the generator, said air speed indicator being calibrated to indicate a change in air speed which is proportional to the voltage output of said generator, a variable resistance in the motor circuit, said resistance being variable in accordance with the flight conditions, a variable resistance in the output side of the generator, said resistance being manually variable in accordance with the conditions incident to the take off and the climb of the plane to stabilized flight conditions, and means for cutting said last named resistance out of the circuit when stabilization has been attained.

9. In a ground trainer for airplane pilots, a motor-generator unit, simulated air speed indicators connected across the output of said generator, a source of potential input connected to the motor armature, a variable resistance in the motor armature circuit and automatically controlled in response to the attitude of said trainer to increase the speed of the motor-generator unit and thereby the air speed indications simultaneously on all indicators with a decrease in the angle of attack, and vice versa, and a resistance and switch in series, connected across the generator output, for operation by the pilot as a simulated landing gear release when closed, to reduce the air speed indications by an amount simulating the reduction in air speed due to air resistance cause by the landing gear.

10. In a ground trainer for airplane pilots, a motor-generator unit, simulated air speed indicators connected across the output of said generator, a source of potential input connected to the motor armature, a variable resistance in series with said source and said armature and automatically controlled in response to the attitude of said trainer to vary the speed of the motor-generator unit and thereby the air speed indications simultaneously on all indicators inversely with the variations in the angle of attack, a resistance and switch in series, connected across the generator output, for operation by the pilot as a simulated landing gear release when closed to reduce the air speed indications by an amount simulating the reduction in air speed due to air resistance caused by the landing gear, and a variable resistance across the generator output for control by the instructor to vary the speed indications to simulate air speed changes during take-off or landing.

11. In a ground trainer for airplane pilots, a motor-generator unit, simulated air speed indicators connected across the output of said generator, a source of potential input connected to the motor armature, a variable resistance in series with said source and said armature and automatically controlled in response to the attitude of said trainer to vary the speed of the motor-generator unit and thereby the air speed indications simultaneously on all indicators inversely with the variations in the angle of attack, a resistance and switch in series, connected across the generator output, for operation by the pilot as a simulated landing gear release when closed to reduce the air speed indications by an amount simulating the reduction in air speed due to air resistance caused by the landing gear, a variable resistance across the generator output for control by the instructor to vary the speed indications to simulate air speed changes during take-off or landing, and a pair of variable resistances in parallel in the motor armature circuit, having sliding contacts for operation by the pilot as twin-engine throttles, switches for normally breaking said contacts to include the full resistances in the parallel branches to simulate dead engine operation, and individual controls for operating said switches to simulate operation of either one or both engines and make throttle operations effective.

12. In a ground trainer, the combination defined in claim 11 having a switch cut-off means in the motor armature circuit for control by the instructor.

CLAUDE K. WILKINSON.
REEVE C. MOREHOUSE.

REFERENCES CITED

The following references are of record in the file of this patent:

UNITED STATES PATENTS

| Number | Name | Date |
|---|---|---|
| 2,099,857 | Link | Nov. 23, 1937 |
| 2,280,117 | Crane | Apr. 21, 1942 |
| 2,366,603 | Dehmel | Jan. 2, 1945 |
| 2,442,205 | Kail | May 25, 1948 |

FOREIGN PATENTS

| Number | Country | Date |
|---|---|---|
| 560,462 | Great Britain | Apr. 5, 1944 |
| 519,961 | Germany | Mar. 6, 1931 |
| 596,883 | Germany | Mar. 12, 1934 |